(12) United States Patent
Walker et al.

(10) Patent No.: US 7,944,687 B2
(45) Date of Patent: May 17, 2011

(54) STORAGE DEVICE CARRIER

(75) Inventors: Robert I. Walker, Clearwater Beach, FL (US); Martin E. Elnicki, St. Petersburg, FL (US); Barry E. Caldwell, Colorado Springs, CO (US)

(73) Assignee: Jabil Circuit, Inc., St. Petersburg, FL (US)

( * ) Notice: Subject to any disclaimer, the term of this patent is extended or adjusted under 35 U.S.C. 154(b) by 201 days.

(21) Appl. No.: 12/246,170

(22) Filed: Oct. 6, 2008

(65) Prior Publication Data
US 2009/0091884 A1 Apr. 9, 2009

Related U.S. Application Data

(60) Provisional application No. 60/977,669, filed on Oct. 5, 2007.

(51) Int. Cl.
*G06F 1/16* (2006.01)

(52) U.S. Cl. ............... 361/679.37; 248/917; 345/183; 463/38; 235/490

(58) Field of Classification Search ............. 361/679.33, 361/679.34, 679.35, 679.36, 679.37, 679.07; 248/917, 201, 279.1, 176.1, 549, 316.1; 345/1.1, 1.3, 179, 184, 163, 44, 157; 463/36, 37, 38; 235/487, 490; 604/113, 131

See application file for complete search history.

(56) References Cited

U.S. PATENT DOCUMENTS

| | | | |
|---|---|---|---|
| D358,141 S | 5/1995 | Pecone et al. | |
| 5,588,728 A | 12/1996 | Eldridge et al. | |
| 6,381,130 B1 * | 4/2002 | Yen | 361/679.33 |
| 6,876,547 B2 | 4/2005 | McAlister | |
| 2002/0085358 A1 * | 7/2002 | Homer et al. | 361/730 |
| 2004/0037034 A1 * | 2/2004 | Suzuki et al. | 361/687 |

* cited by examiner

Primary Examiner — Hung V Duong

(57) ABSTRACT

Carriers for a data storage device. The carriers comprise a support member sized and shaped to receive and retain the data storage device. The carriers also comprise one or more projecting members configured to retain the data storage device in the support member. The projecting member extends from a portion of the carrier towards the data storage device. The projecting member is retained in position by a structure selected from the group consisting of a rail and a sidewall of the support member. The projecting member can comprises a pin.

20 Claims, 10 Drawing Sheets

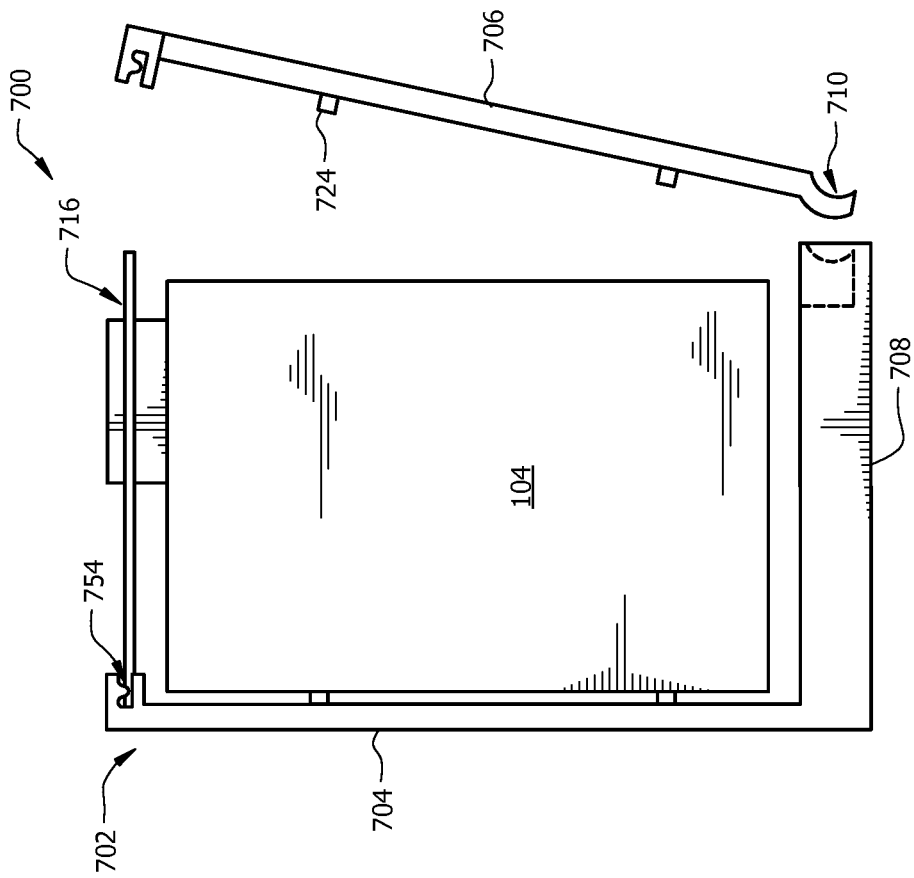
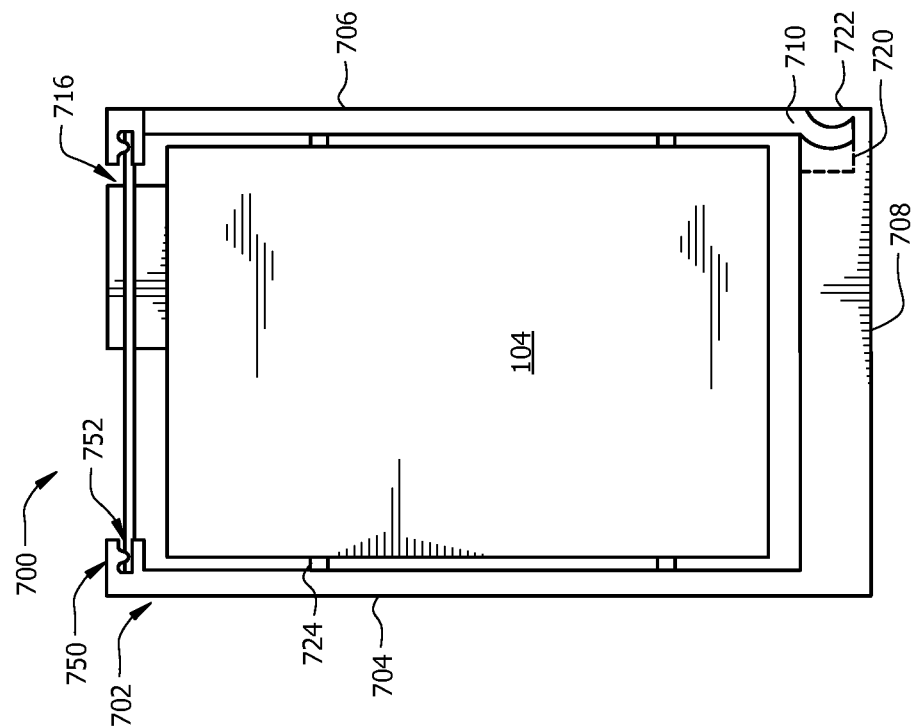
FIG. 7A
FIG. 7B

STORAGE DEVICE CARRIER

CROSS REFERENCE TO RELATED APPLICATIONS

The present application claims the priority of U.S. provisional patent application Ser. No. 60/977,669 filed Oct. 5, 2007, entitled "Toolless Drive Carrier" and is incorporated herein in its entirety.

BACKGROUND OF THE INVENTION

1. Statement of the Technical Field

The present invention relates to storage device carriers and chassis assemblies. More particularly, the present invention relates to storage device carriers comprising a support member (e.g., a tray, a sled, a frame, or a pair of rails) in which a storage device (e.g., a Hard Disk Drive or a Solid State Disk drive) can be inserted and retained therein without the use of a tool (e.g., a screwdriver).

2. Description of the Related Art

Conventional computer systems and information networks require external data storage for storing large volumes of data. The external data storage typically includes Hard Disk Drives (HDDs) or Solid State Disk (SDD) drives. The HDDs (or SDD drives) typically include one inch (1") HDDs (or SDD drives), one and a third inch (1.3") HDDs (or SDD drives), one and eight inch (1.8") HDDs (or SDD drives), two and a half inch (2.5") HDDs (or SDD drives), and three and a half inch (3.5") HDDs (or SDD drives).

Various mechanisms have been developed for housing the HDDs or SDD drives. One such mechanism is referred to as a hard disk drive (HDD) carrier and chassis assembly. The HDD carrier and chassis assembly accommodates the HDD and mechanically mates with the chassis assembly. During operation, an HDD is typically disposed in the HDD carrier. The HDD carrier is then inserted into a drive cage (or drive bay) in a computer chassis. An electromagnetic interface (EMI) shield is often included as part of the HDD carrier. The EMI shield functions to prevent any EMI interference from radiating outside of the computer or disk enclosure.

Despite the advantages of the HDD carrier and chassis assembly, it suffers from certain drawbacks. For example, the components of the HDD carrier are assembled using tools (e.g., screwdrivers). As such, the method for assembling an HDD carrier is relatively time consuming and cumbersome.

SUMMARY OF THE INVENTION

This summary is provided to comply with 37 C.F.R. §1.73, presenting a summary of the invention briefly indicating the nature and substance of the invention. It is submitted with the understanding that it will not be used to interpret or limit the scope or meaning of the claims.

Embodiments of the present invention relate to carriers for a data storage device. The carriers comprise a support member sized and shaped to receive and retain the data storage device. The carriers also comprise one or more projecting members configured to retain the data storage device in the support member. The projecting member extends from a portion of the carrier towards the data storage device. The projecting member is retained in position by a structure selected from the group consisting of a rail and a sidewall of the support member. The projecting member can comprise a pin (or post).

According to an embodiment of the present invention, the support member is a tray including sidewalls coupled to a planar base member. One or more of the sidewalls has at least one aperture formed therethrough sized and shaped to receive the projecting member. The projecting member is disposed on a first face of a planar plate (or pin rail) so as to project outwardly therefrom. The planar plate (or pin rail) can be secured to the support member by the rail. A light pipe is also provided that can be secured to the support member by the rail. The rail comprises a capturing structure for capturing a peripheral edge portion of a paddle card termination. An Electro Magnetic Interference (EMI) shielding gasket can further be provided that is captured between two or more rails and a bezel.

According to another embodiment of the present invention, the support member has a c-shape defined by a plurality of sidewalls. The projecting member is disposed on one of the sidewalls and extends outwardly therefrom. At least one of the sidewalls is formed of a flexible material and/or is removably coupled to the support member. If the sidewall is removably coupled to the support member, then the sidewall can comprise a coupling structure selected from the group consisting of a hook and/or a hinge. At least one of the sidewalls also includes a capturing structure for capturing a peripheral edge portion of a paddle card termination. At least one of the sidewalls can also have a light pipe embedded therein.

Embodiments of the present invention also relate to methods for assembling a data storage device carrier assembly. The methods involve inserting a data storage device into an insert space of a support member defined by a plurality of sidewalls. The methods also involve removably securing the data storage device within the support member using at least one projecting member. The projecting member extends from a portion of the data storage device carrier assembly towards the data storage device. The projecting member can be a pin (or post). The methods further involve retaining the projecting member in position by a structure selected from the group consisting of a rail and a sidewall of the support member.

According to an embodiment of the present invention, the methods involve the step of bending one of the sidewalls until it reaches an opened position prior to inserting the data storage device into the insert space of the support member. Alternatively, the method involves decoupling one of the sidewalls from the support member prior to inserting the data storage device into the insert space of the support member. The method can further involve securing a paddle card termination to the support member using at least one capturing mechanism configured for capturing the paddle card termination without the use of a tool.

BRIEF DESCRIPTION OF THE DRAWINGS

Embodiments of the present invention will be described with reference to the following drawing figures, in which like numerals represent like items throughout the figures, and in which:

FIG. 7A is a top view of a third alternative embodiment of an HDD carrier assembly in a closed position that is useful for understanding the present invention.

FIG. 7B is a top view of the HDD carrier assembly of FIG. 7A in a partially open position that is useful for understanding the present invention.

DETAILED DESCRIPTION OF THE PREFERRED EMBODIMENTS

Embodiments of the present invention will now be described with respect to FIGS. 1-10. Embodiments of the present invention relate to storage device (e.g., a Hard Disk Drive or Solid State Disk drive) carrier assemblies that can be removably housed in a chassis (e.g., a drive cage or drive bay in a computer chassis). More particularly, embodiments of the present invention concern storage device carrier assemblies comprising support structures (e.g., a tray, a sled, a frame, or a pair of rails) in which storage devices can be inserted and retained therein without the use of tools (e.g., a screw driver). As such, embodiments of the present invention overcome certain drawbacks of conventional storage device carrier and chassis assemblies. More particularly, storage device carrier embodiments of the present invention facilitate an improved method for inserting storage devices into, retaining storage devices in, and removing storage devices from storage device carriers. The improved method is less time consuming and cumbersome than the conventional methods of assembling and/or dissembling storage device carrier assemblies.

Before describing the storage device carrier assemblies of the present invention, it will be helpful in understanding an exemplary environment in which the invention can be utilized. In this regard, it should be understood that the storage device carrier assemblies of the present invention can be utilized in a variety of different applications where external data storage (e.g., a Hard Disk Drive, a Compact Disc Drive, a Solid State Disk drive, and/or a Digital Versatile Disk drive) is needed for storing large volumes of data. Such applications include, but are not limited to, computer system applications, server applications, storage appliance applications, Just A Bunch Of Disks (JBOD) storage applications, and information network applications. Accordingly, embodiments of the present invention will be described in relation to a computer system computer application where hard disk drives (HDDs) are used for storing data.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
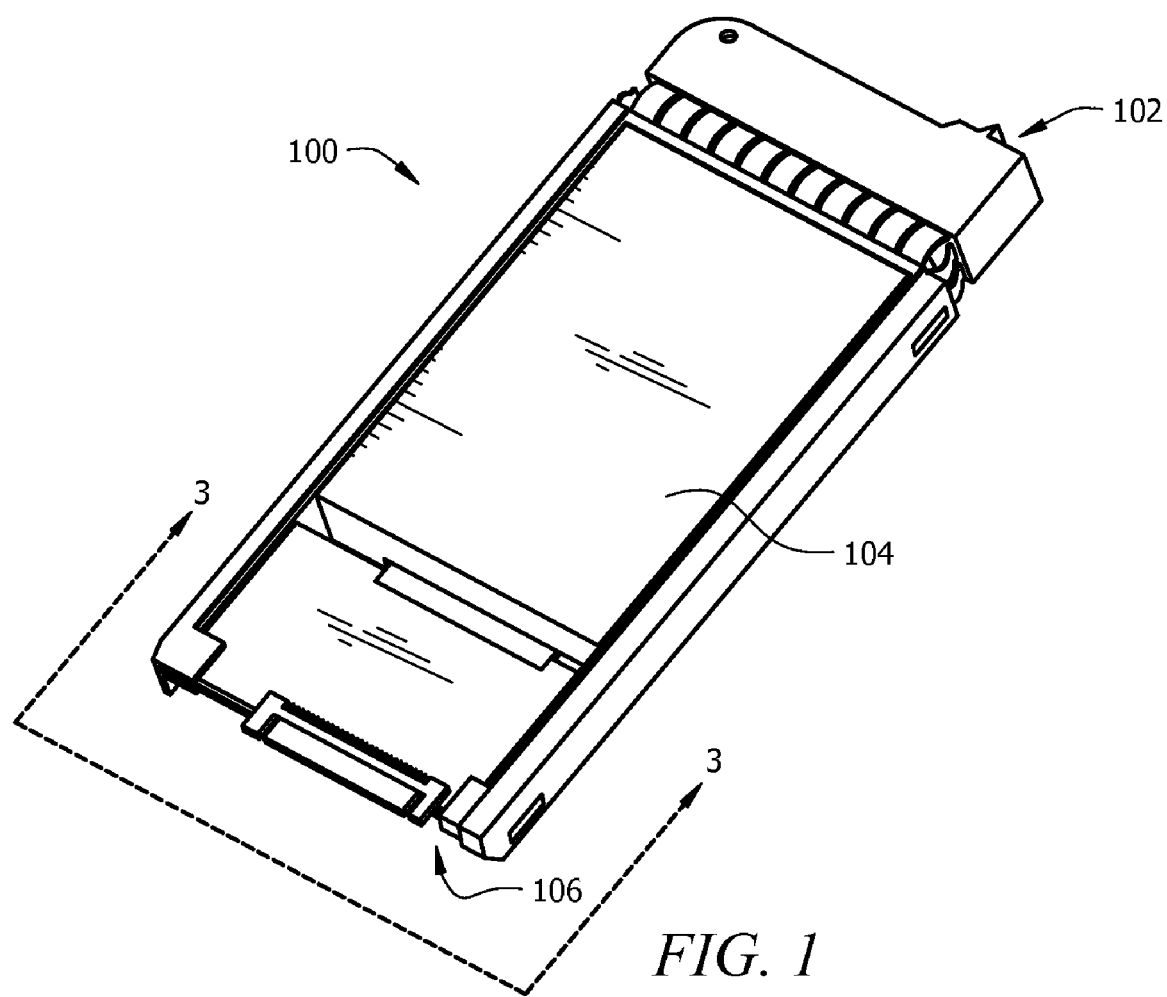
FIG. 1 is a top perspective view of an exemplary hard disk drive (HDD) carrier assembly that is useful for understanding the present invention.

Referring now to FIG. 1, there is provided a top perspective view of an exemplary hard disk drive (HDD) carrier assembly 100 according to an embodiment of the present invention. The HDD carrier assembly 100 can be housed in a chassis (e.g., a drive cage). Chassis are well known to those having ordinary skill in the art, and therefore will not be described herein. However, it should be understood that the HDD carrier assembly 100 can be housed in any chassis selected in accordance with a particular HDD application.

Figure 4:
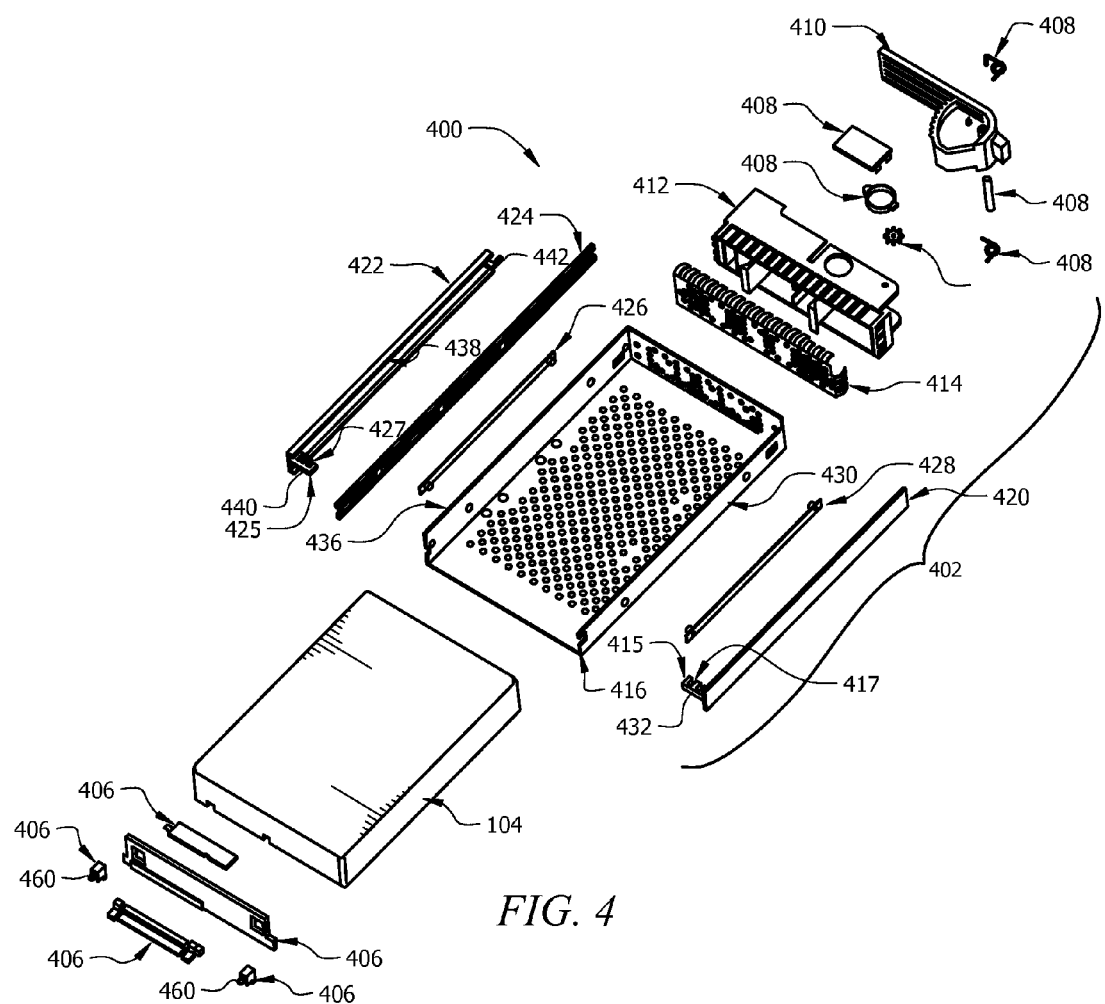
FIG. 4 is an exploded view of a first alternative embodiment of an HDD carrier assembly that is useful for understanding the present invention.

The HDD carrier assembly 100 comprises an HDD carrier 102, an HDD 104, and a horizontally arranged paddle card termination (PCT) 106. It should be noted that embodiments of the present invention are not limited to horizontally arranged PCTs. For example, embodiments of the present invention can alternatively or additionally include vertically arranged PCTs (as shown in FIG. 4). The HDD carrier 102 is generally configured for removably retaining the HDD 104. The HDD carrier 102 is advantageously configured to facilitate the insertion and retention of an HDD 104 therein without the use of tools (e.g., screwdrivers). The HDD carrier 102 is also advantageously configured to facilitate the removal of the HDD 104 therefrom without the use of tools (e.g., screw drivers). This toolless feature of the HDD carrier 102 will become more evident as the discussion progresses.

HDDs 104 are well known to those having ordinary skill in the art, and therefore will not be described herein. However, it should be understood that the HDD 104 is a non-volatile data storage device which stores large volumes of data. The HDD 104 can include, but is not limited to, a one inch (1") HDD, a one and a third inch (1.3") HDD, a one and an eight inch (1.8") HDD, a two and a half inch (2.5") HDD, a three and a half inch (3.5") HDD, and a five and a quarter inch (5.25") HDD. Disk Drives can be of the form of a traditional disk with one (1) or more spinning disks or platters. Disk Drives can also be in the form of a Solid State Disk with the use of Flash Integrated Circuits and no moving parts.

Figure 2:
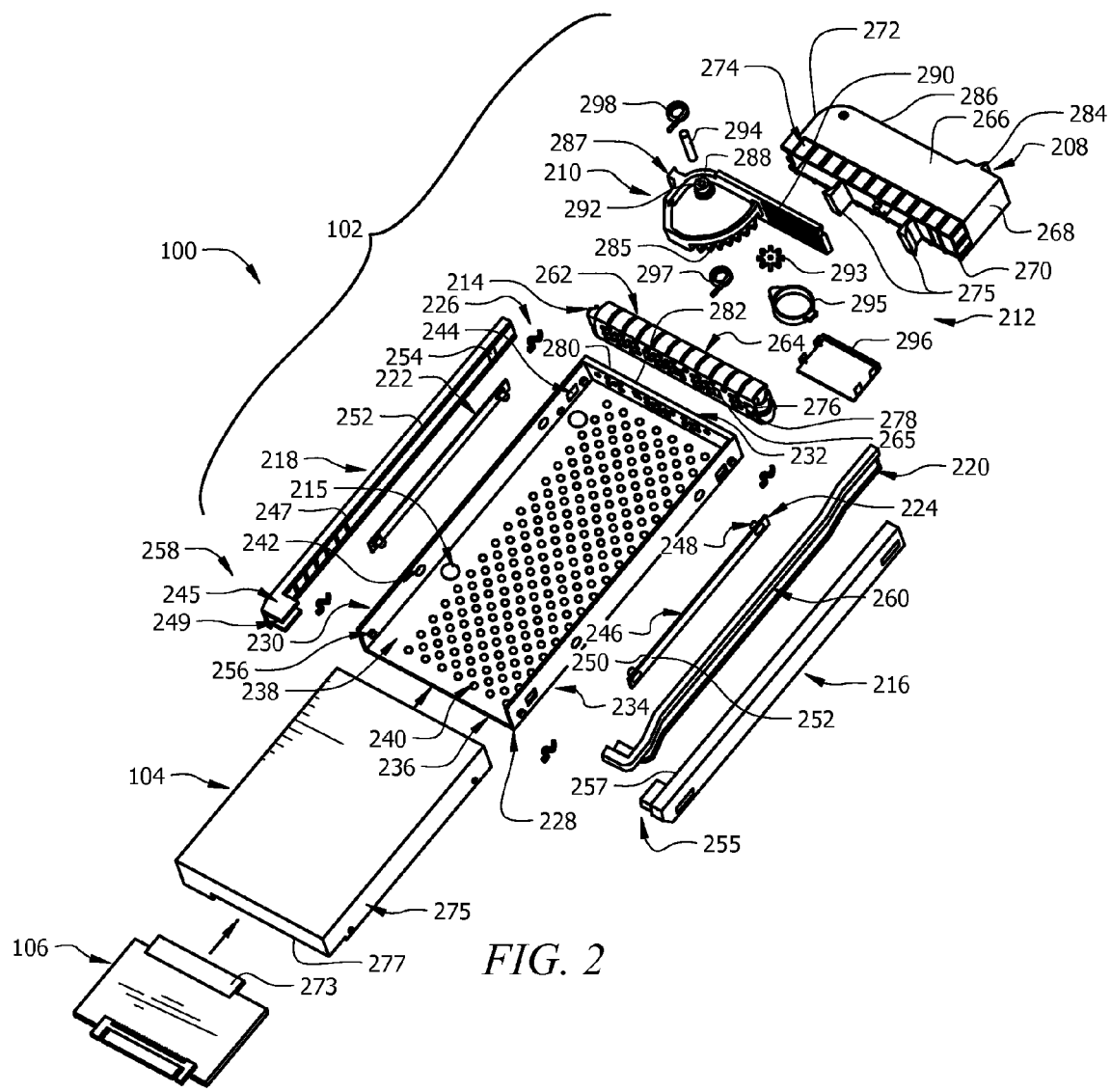
FIG. 2 is an exploded view of the HDD carrier assembly in FIG. 1.
Figure 3:
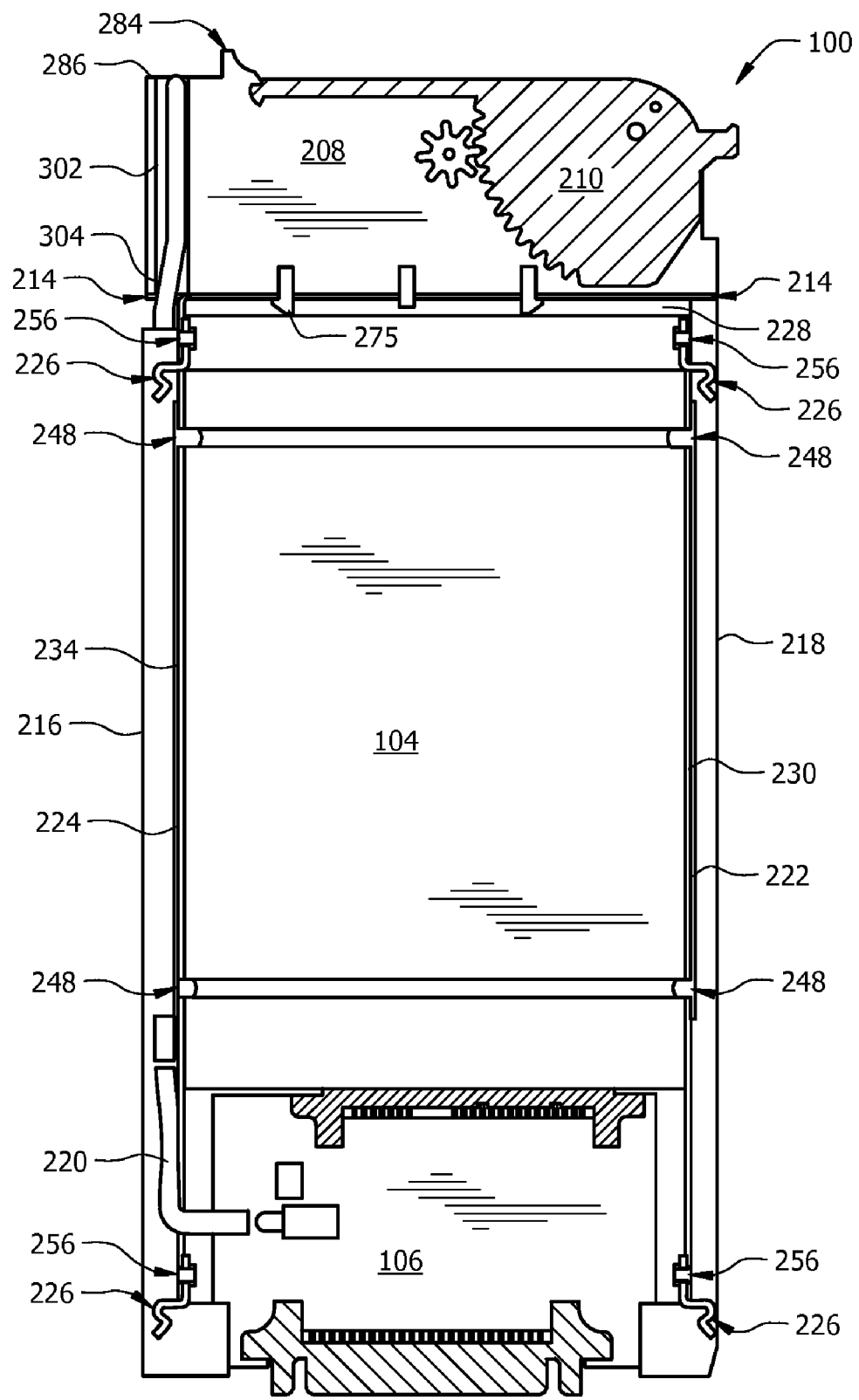
FIG. 3 is a cross sectional view of the HDD carrier assembly of FIG. 1, taken along line 3-3 in FIG. 1.

The HDD carrier assembly 100 will now be described in more detail in relation to FIGS. 2-3. An exploded view of the HDD carrier assembly 100 is provided in FIG. 2. A cross sectional view of the assembled HDD carrier assembly 100 is provided in FIG. 3. As shown in FIGS. 2-3, the HDD carrier 102 comprises a bezel 208, an ejection handle 210, a damper mechanism 212, and an Electro Magnetic Interference (EMI) shielding gasket 214. The HDD carrier 102 is also comprised of slide rails 216, 218, at least one light pipe 220, pin rails 222, 224, springs 226, and a support member 228. Notably, each of the components 208, . . . , 228 can be assembled without the use of a tool (e.g., a screwdriver). The toolless assembly feature of the HDD carrier 102 will become more evident as the discussion progresses.

Although the components 216, 220, 224 and 218, 222 are shown to be separate components, embodiments of the present invention are not limited in this regard. For example, the components 216, 220, 224 and 218, 222 can comprise single components. In such a scenario, the light pipe 220 and pin rail 224 can be embedded in, coupled to, or disposed on the slide rail 216. Similarly, the pin rail 222 can be embedded in, coupled to, or disposed on the slide rail 218. It should also be noted that the slide rails 216, 218 can be coupled to the bezel 208 so as to form a C-shaped member.

The support member 228 is generally configured for receiving the HDD 104. As such, the support member 228 can comprise a tray (or sled) as shown in FIG. 2. Still, embodiments of the present invention are not limited in this regard. For example, the support member 228 can alternatively comprise a pair of side rails, a frame or a cage. If the support member 228 is a tray (or sled), then it comprises three (3) sidewalls 230, 232, 234 coupled to a base member 236. The sidewalls 230, 232, 234 can be integrally formed with the base member 236. The sidewalls 230, 232, 234 and base member 236 define an insert space 238 sized and shaped for receiving and retaining the HDD 104. The support member 228 can be formed of any suitable material. Such materials include, but are not limited to, metal materials, composite materials, and plastics.

The base member 236 is generally a planar plate and can include a plurality of apertures (or bores) 240 formed therein. If included, the apertures (or bores) 240 provide a means for allowing air passage through the HDD carrier 102 and heat from the HDD 104 to dissipate to a surrounding environment. The aperture (or bores) 240 can have any shape and/or size selected in accordance with a particular HDD carrier 102 application. Also, any number of apertures (or bores) 240 can be formed in the base member 236. The base member 236 can also comprise a plurality of raised members 215 for ensuring that the HDD 104 resides a predefined distance above the base member when fully inserted into the insert space 238 of the support member 228.

The sidewall 232 can include a plurality of openings 282 formed therein. The openings 282 allow air passage through the HDD carrier 102. The openings 282 also allow heat from the HDD 104 to dissipate to a surrounding environment.

Each of the sidewalls 230, 234 comprises at least one (1) aperture (or bore) 242 and insert-hole 244 formed therein. The aperture(s) 242 and insert-hole(s) 244 facilitate the retention of the HDD 104 within the insert space 238 of the support member 228. In this regard, it should be understood that the aperture(s) 242 is(are) sized and shaped to receive at least a portion of a pin rail 222, 224 (as shown in FIG. 3). For example, the aperture(s) 242 is(are) sized and shaped to receive a pin (or post) coupled to the pin rail 222, 224. The insert-hole(s) 244 is(are) sized and shaped to receive at least a portion of a slide rail 216, 218 and/or a spring 226 (as shown in FIG. 3).

According to an embodiment of the present invention, the aperture(s) 242 is(are) substantially circular in shape. The insert hole(s) 244 is(are) substantially rectangular in shape. Embodiments of the present invention are not limited in this regard.

Each of the sidewalls 230, 234 also comprises at least one pin (or post) 256 having an aperture (not shown) formed therethrough along the pin's horizontal axis (not shown). The pins 256 can be disposed at opposing ends of a respective sidewall 230, 234. The pins 256 can also be disposed on a respective sidewall 230, 234 so that its apertures (not shown) are horizontally aligned with the insert holes 244 of the sidewall 230, 234. The apertures (not shown) are sized and shaped so that the pins 256 can engage the springs 226, respectively. The springs 226 facilitate the retention of the components 216, 218, 220, 222, 224 to the support member 228. This retention function of the springs 226 will become more evident as the discussion progresses. It should be noted that the pins 256 and/or the springs 226 provide a toolless securing/locking mechanism. Embodiments of the present invention are not limited in this regard. For example, the toolless securing/locking mechanism can also include plastic or metal forms or clips coupled to the slide rails 216, 218 and configured for engaging sidewalls 230, 234 of the support member 228.

Each of the pin rails 222, 224 facilitates the toolless retention of the HDD 104 within the support member 228. In this regard, it should be understood that each pin rail 222, 224 comprises a planar plate 246 and at least one toolless securing structure. The toolless securing structure can include at least one pin (or post) 248 (as shown in FIGS. 2-3). The plate 246 comprises a first face 250 and a second opposing face 252. The pins 248 are disposed on the first face 250 and extend outwardly from opposing ends thereof. The pins 248 can have any size and shape suitable for insertion through apertures 242 formed in the sidewalls 230, 234 of the support member 228. The pins 248 can also have any size and shape suitable for engaging the HDD 104 so as to retain the same within the insert space 238 of the support member 228. The plate 246 and pins 248 can be formed of any suitable material. Such materials include, but are not limited to, metal materials, composite materials, and plastics. Embodiments of the present invention are not limited in this regard. For example, the pins 248 can be coupled to, disposed on, or embedded in the support member 228 and/or the slide rails 216, 218.

The slide rail 218 facilitates the retention of the pin rail 222 to the support member 228. Accordingly, the slide rail 218 is configured to slidingly engage the sidewall 230 of the support member 228. The slide rail 218 comprises a cavity 252 sized and shaped for receiving the pin rail 222. The slide rail 218 also comprises cavities 254 disposed at opposing ends thereof. Each of the cavities 254 is sized and shaped for receiving and retaining at least a portion of a spring 226 therein. Still, embodiments of the present invention are not limited in this regard. For example, the springs 226 can be integrally molded with the slide rail 218 during an injection molding process. The springs 226 facilitate the retention of the slide rail 218 to the support member 228. In this regard, it should be understood that the springs 226 engage the pins 256 of the support member 228 when the slide rail 218 slidingly engages the support member 228. The slide rail 218 can be formed of any suitable material. Such materials include, but are not limited to, metal materials, composite materials, and plastics.

The slide rail 218 is also configured to removably capture the PCT 106. In this regard, it should be understood that the slide rail 218 comprises a u-shaped toolless capturing member 245 extending away from a surface 247 thereof. The capturing member 245 defines a channel 249 for receiving at least a portion of the PCT 106 (as shown in FIG. 3). The capturing member 245 ensures that the PCT 106 is horizontally aligned with the HDD 104 when they are being retained or housed within the HDD carrier 102. Embodiments of the present invention are not limited in this regard. For example, if the PCT is a vertically arranged PCT, then the capturing member can be configured for ensuring that the PCT is aligned with the HDD when they are being retained or housed within the HDD carrier 102. In such a scenario, the channels can be vertical channels (instead of horizontal channels as shown in FIGS. 1-3).

Light pipes 220 are well known to those having ordinary skill in the art, and therefore will not be described herein. However, it should be understood that the light pipes 220 provide fault and activity indicator illuminations from light sources of the rear end 258 of the HDD carrier 102 (or directly from the connector of the HDD 104 to which the PCT 106 plugs into) to the bezel 208. The light pipes 220 comprise an insert space 260 sized and shaped for receiving the pin rail 224.

The slide rail 216 facilitates the retention of the pin rail 224 and the light pipes 220 to the support member 228. Accordingly, the slide rail 216 is configured to slidingly engage the sidewall 234 of the support member 228. The slide rail 216 comprises a cavity (not shown) sized and shaped for receiving the pin rail 224 and light pipes 220. The slide rail 216 also comprises spring cavities (not shown) disposed at opposing ends thereof. Each of the spring cavities (not shown) is sized and shaped for receiving and retaining at least a portion of a spring 226 therein. Still, embodiments of the present invention are not limited in this regard. For example, the springs 226 can be integrally molded with the slide rail 216 during an injection molding process. The springs 226 facilitate the retention of the slide rail 216 to the support member 228 by engaging the pins 256 of the support member 228. The slide rail 216 can be formed of any suitable material. Such materials include, but are not limited to, metal materials, composite materials, and plastics.

The slide rail 216 is also configured to removably capture the PCT 106. In this regard, it should be understood that the slide rail 216 comprises a u-shaped toolless capturing member 255 extending away from a surface 257 thereof. The capturing member 255 defines a channel for receiving at least a portion of the PCT 106 (as shown in FIG. 3). The capturing member 255 ensures that the PCT 106 is horizontally aligned with the HDD 104 when they are being housed within the HDD carrier 102.

The EMI shielding gasket 214 is well known to those having ordinary skill in the art, and therefore will not be described herein. However, it should be understood that the EMI shielding gasket 214 is generally configured for providing an EMI shield between a surrounding drive cage (not shown) and at least one HDD carrier 102. The EMI shielding gasket 214 is formed of an electrically conductive material, such as stainless steel. The EMI shielding gasket 214 comprises a plurality of fingers 264 defining an insert space 262. The fingers 264 are configured for engaging exterior surfaces of the bezel 208. The insert space 262 is sized and shaped for receiving the bezel 208. The EMI shielding gasket 214 also comprises a plurality of openings 276 formed therein for the passage of air therethrough. The EMI shielding gasket 214 further comprises a planar face 278 for engaging a surface 280 of the support member's sidewall 232.

The bezel 208 is configured to engage the EMI shielding gasket 214. Accordingly, the bezel 208 comprises external surfaces 266, 268, 270, 272 having cavities 274 formed thereon. Each of the cavities 274 is sized and shaped to receive a respective finger 264 of the EMI shielding gasket 214. The bezel 208 also comprises one or more toolless securing structure. The toolless securing structure can include clips 275 for insertion through the apertures 265 of the EMI shielding gasket 214 (as shown in FIG. 3). Once fully inserted through the apertures 265, the clips 275 engage a surface of the EMI shielding gasket 214 so as to removably secure the EMI shielding gasket 214 thereto (as shown in FIG. 3). Notably, the bezel 208 can be coupled to the EMI shielding gasket 214 and decoupled from the EMI shielding gasket 214 without the use of a tool (e.g., a screwdriver). Embodiments of the present invention are not limited in this regard. For example, the clips 275 can also engage a sidewall 232 of the support member 228 for removably securing the components 208, 214 thereto (not shown). Also, the bezel 208 can alternatively be coupled to the EMI shielding gasket 214 via screws or other suitable mechanical coupling means.

The bezel 208 and EMI shielding gasket 214 can be coupled to the support member 228 by the light pipes 220 (as shown in FIG. 3) and/or at least one of the slide rails 216, 218. In such a scenario, the coupled components 208, 214 can be at least partially captured between the slide rails 216, 218. The components 208, 214 can also include respective apertures (or bores) 302, 304 formed therein sized and shaped for receiving the light pipes 220 (as shown in FIG. 3).

The bezel 208 is also configured to house the ejection handle 210 and the damper mechanism 212. The bezel 208 has an actuator 284 protruding from a surface 286 thereof. The actuator 284 is configured to actuate and/or release the ejection handle 210 for coupling and/or decoupling the HDD carrier 102 to/from a surrounding drive cage (not shown). The bezel 208 can be formed of any suitable material. Such materials include, but are not limited to, metal materials, composite materials, and plastics.

The ejection handle 210 and damper mechanism 212 assembly is similar to those well known to persons having ordinary skill in the art. However, the features of the ejection handle 210 and damper mechanism 212 are described herein for purposes of completeness.

The ejection handle 210 facilitates the coupling and/or decoupling of the HDD carrier 102 to/from the surrounding drive cage (not shown). The ejection handle 210 can be disposed within the bezel 208 without the use of a tool. The ejection handle 210 can have any shape selected in accordance with a particular HDD carrier 102 application. For example, the ejection handle 210 can comprise a main body 288 and an elongated actuator 290 extending away from the main body 288. The ejection handle 210 can have any shape selected in accordance with a particular HDD carrier 102 application. For example, the ejection handle 210 can have a substantially P-shape as shown in FIGS. 2-3. Also, the elongated actuator 290 can have apertures formed therethrough for allowing air passage through the HDD carrier 102 and heat from the HDD 104 to dissipate to a surrounding environment. The elongated actuator 290 can also have any shape and size selected in accordance with a particular ejection handle 210 application.

The main body 288 can have an aperture 292 formed therein sized and shaped for receiving a pin (or post) 294 of the (optional) damper mechanism 212. The main body 288 can also have a cam foot 287 protruding therefrom for engaging a surrounding drive cage (not shown). The cam foot 287 facilitates the coupling and decoupling of the HDD carrier 102 to the surrounding drive cage (not shown). The main body 288 can further comprise cogs 285 for engaging the damper mechanism 212 so as to dampen the opening of the ejection handle 210 when it is released via a depression of the actuator 284 of the bezel 208. The elongated actuator 290 is configured for engaging the actuator 284 of the bezel 208.

The damper mechanism 212 can generally be a cog and spring loaded mechanism to provide a damped opening of the ejection handle 210. The damper mechanism 212 can be disposed within the bezel 208 without the use of a tool. According to an embodiment of the present invention, the damper mechanism 212 is comprised of a cog 293, a pin 294, a damper mechanism 295, a plate 296, and springs 297, 298. Each of the components 293, . . . , 298 are well known to those having ordinary skill in the art, and therefore will not be described in detail herein. However, it should be understood that the plate 296 secures the damper mechanism 212 and the ejection handle 210 within the bezel 208. The pin 294 and spring 298 collectively act to spring forth open the ejection handle 210. The spring 297, cog 293, and damper mechanism 295 collectively act to slow or dampen the opening of the ejection handle 210 when it is released via a depression of the actuator 284 of the bezel 208. Embodiments of the present invention are not limited in this regard.

The HDD 104 comprises a plurality of aperture (or bores) 275 formed therein. The apertures (or bores) 275 facilitate retention of the HDD 104 within the insert space 238 of the support member 228. In this regard, it should be understood that the apertures (or bores) 275 are sized and shaped for receiving and engaging at least a portion of a pin rail 222, 224 (as shown in FIG. 3). Once the HDD 104 is fully inserted into the insert space 238 of the support member 228, the portion of the pin rail 222, 224 is inserted into the apertures (or bores) 275 so as to secure the HDD 104 to the support member 228 (as shown in FIG. 3). Also, the PCT 106 can be coupled to the HDD 104 without the use of a tool. This coupling can be achieved by inserting a female connector 273 of the PCT 106 into a mating male connector (or plug) 277 of the HDD 104.

PCTs are well known to those having ordinary skill in the art, and therefore will not be described herein. However, it should be understood that the PCT 106 is generally configured for providing various power delivery functions, control functions, power conversion functions, and electronic conversion functions. The PCT 106 is also generally configured for providing a Serial ATA compatible multiplexer (MUX) connection. Serial ATA compatible MUXs are also well known to those having ordinary skill in the art, and therefore will not be described herein.

Figure 5:
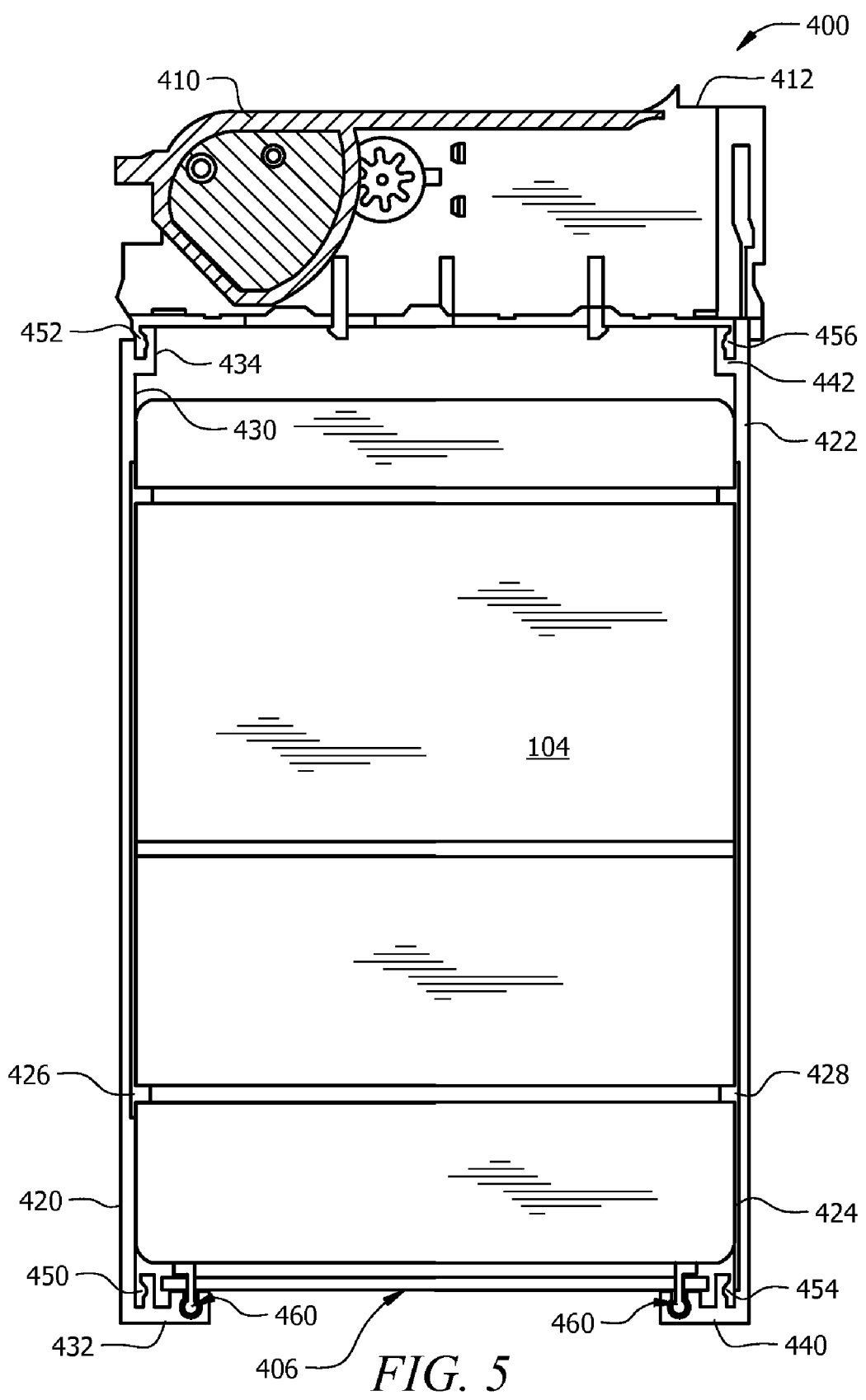
FIG. 5 is a cross sectional view of the HDD carrier assembly of FIG. 4 in an assembled state that is useful for understanding the present invention.

Referring now to FIGS. 4-5, another exemplary HDD carrier assembly 400 will be described. An exploded view of the HDD carrier assembly 400 is provided in FIG. 4. A top cross sectional view of the HDD carrier assembly 400 is provided in FIG. 5. As shown in FIGS. 4-5, the HDD carrier assembly 400 comprises the HDD 104, a vertically arranged PCT 406, and an HDD carrier 402. The HDD carrier 402 comprises a damper mechanism 408, an ejection handle 410, a bezel 412, an EMI shielding gasket 414, a support member 416, a light pipe 424, and pin rails 426, 428. Components 406, ..., 416, 424, 426, 428 are the same as or substantially similar to the component 106, 212, 210, 208, 214, 228, 220, 222, 224 of FIGS. 2-3, respectively. As such, these components 406, ..., 416, 424, 426, 428 will not be described in relation to FIGS. 4-5.

As also shown in FIGS. 4-5, the HDD carrier 402 further comprises slide rails 420, 422. The slide rail 420 facilitates the retention of the pin rail 428 to the support member 416. Accordingly, the slide rail 420 is configured to slidingly engage a sidewall 430 of the support member 416. The slide rail 420 can comprise a cavity (not shown) sized and shaped for receiving the pin rail 428. The slide rail 420 also comprises at least one clip 432, 434 for facilitating the retention of the HDD 104 within the support member 416. The one or more clips 432, 434 are configured to engage protrusions 450, 452 formed on the sidewall 430 of the support member 416 (as shown in FIG. 5). The slide rail 420 can be formed of any suitable material. Such materials include, but are not limited to, metal materials, composite materials, and plastics.

The slide rail 420 is also configured to removably capture the PCT 406. In this regard, it should be understood that the slide rail 420 comprises a vertically arranged u-shaped toolless capturing member 415 extending from the clip 432. The capturing member 415 defines a vertical channel 417 for receiving at least a portion of the PCT 406. The capturing member 415 ensures that the PCT 406 is aligned with the HDD 104 when they are being housed within the HDD carrier 402.

The slide rail 422 facilitates the retention of the light pipe 424 and the pin rail 426 to the support member 416. Accordingly, the slide rail 422 is configured to slidingly engage the sidewall 436 of the support member 416. The slide rail 422 comprises a cavity 438 sized and shaped for receiving the pin rail 426 and the light pipe 424. The slide rail 422 also comprises one or more clips 440, 442 for facilitating the retention of the HDD 104 within the support member 416. The one or more clips 440, 442 are configured to engage protrusions 454, 456 formed on the sidewall 436 of the support member 416 (as shown in FIG. 5). The slide rail 422 can be formed of any suitable material. Such materials include, but are not limited to, metal materials, composite materials, and plastics.

The slide rail 422 is also configured to removably capture the PCT 406. In this regard, it should be understood that the slide rail 422 comprises a vertically arranged u-shaped toolless capturing member 425 extending from the clip 440. The capturing member 425 defines a vertical channel 427 for receiving at least a portion of the PCT 406. The capturing member 425 ensures that the PCT 406 is aligned with the HDD 104 when they are being housed within the HDD carrier 402.

It should be noted that the HDD carrier assembly 100 can be assembled without the use of tools (e.g., screwdrivers). This toolless assembly is facilitated by the toolless features of the pin rails 222, 224 and the slide rails 216, 218. For example, the pin rails 222, 224 comprise pins (or posts) that retain a storage device in a support member. The pin rails 222, 224 are retained in position by the slide rails 216, 218 that can be coupled to the support member without use of a tool. The slide rails 216, 218 also comprises capturing structures that can capture a PCT without the use of a tool.

Figure 6B:
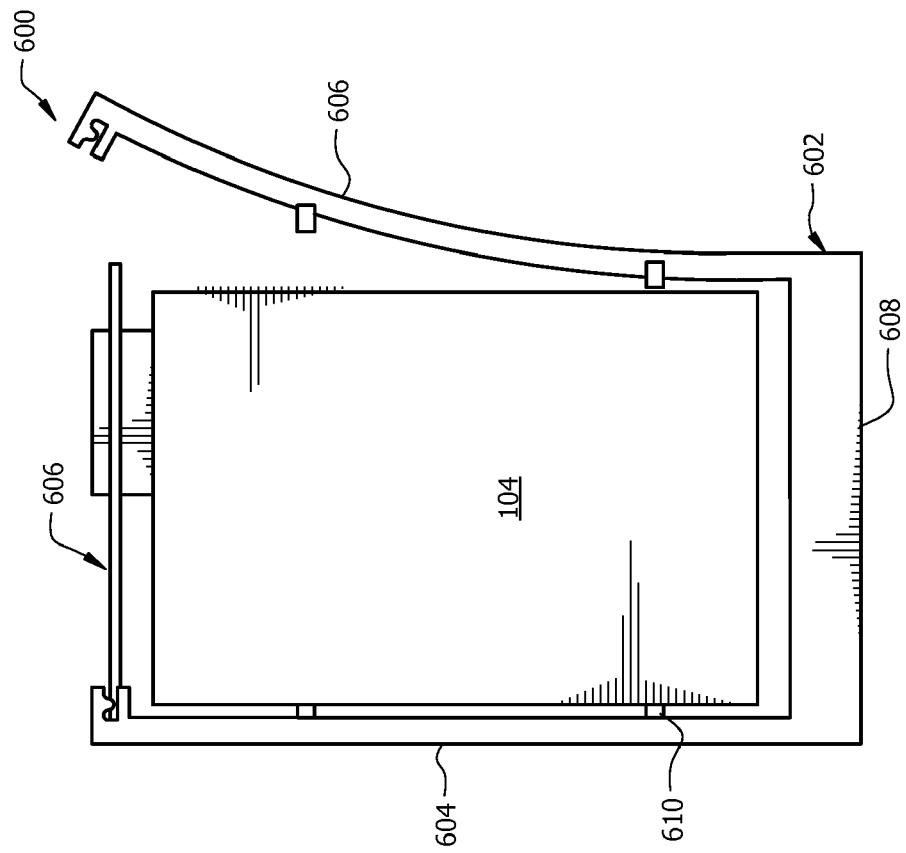
FIG. 6B a top view of the HDD carrier assembly of FIG. 6A in a partially open position that is useful for understanding the present invention.
Figure 6A:
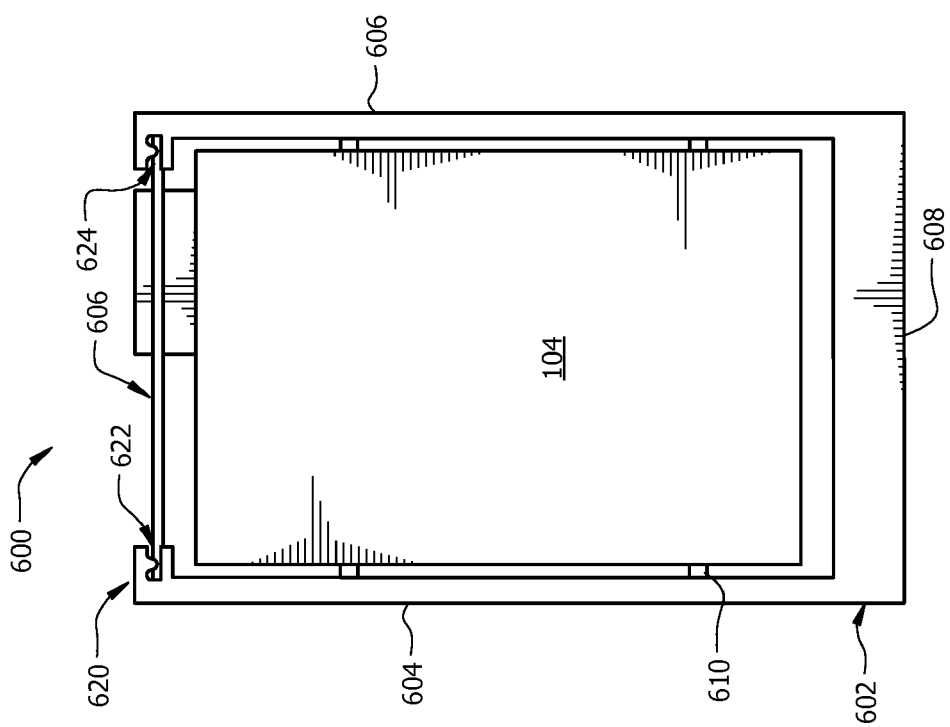
FIG. 6A is a top view of a second alternative embodiment of an HDD carrier assembly in a closed position that is useful for understanding the present invention.

Referring now to FIGS. 6A-6B, there are provided top views of another exemplary HDD carrier assembly 600 according to an embodiment of the present invention. The top view of FIG. 6A shows the HDD carrier assembly 600 in a closed position. In contrast, the top view of FIG. 6B shows the HDD carrier assembly 600 in a partially opened position. In the opened position, the HDD 104 can be inserted in or removed from the HDD carrier 602. Similarly, the vertically arranged PCT 606 can be inserted in or removed from the HDD carrier 602.

As shown in FIGS. 6A-6B, the HDD carrier 602 is generally C-shaped. The HDD carrier 602 comprises three (3) sidewalls 604, 606, 608. The sidewalls 604, 606, 608 can be coupled together via an adhesive or other suitable coupling means. The sidewalls 604, 606, 608 can also be integrally molded as a single component during an injection molding process or machined as a single component during a machining process. At least one of the sidewalls 606 is formed of a flexible material, such as a softer compound plastic then that of components 604, 608 or a rubber. As such, the flexible sidewall 606 can be bent away from the other sidewall 604 so as to permit the insertion/removal of the components 104, 606 to/from the HDD carrier 602.

Each of the sidewalls 604, 606 comprise one or more pins (or posts) 610 extending therefrom. The pins 610 facilitate the retention of the HDD 104 within the HDD carrier 602. The pins 610 can have any size and shape suitable for insertion through apertures (not shown) formed in the HDD 104. In effect, the pins 610 removably retain the HDD 104 to the HDD carrier 602.

Each of the sidewalls 604, 606 is also configured to removably capture the PCT 606. In this regard, it should be understood that each of the sidewalls 604, 606 comprises a u-shaped toolless capturing member 620 extending away therefrom. The capturing member 620 defines a channel 622 for receiving at least a portion of the PCT 606 (as shown in FIGS. 6A-6B). The capturing member 620 can have a grip 624 disposed in the channel 622 for gripping a surface of the PCT 606. The capturing member 620 can also ensure that the PCT 606 is aligned with the HDD 104 when they are being retained within the HDD carrier 602.

Although not shown in FIGS. 6A-6B, the HDD carrier assembly 600 can also comprise a damper mechanism (not shown), an ejection handle (not shown), a bezel (not shown), an EMI shielding gasket (not shown), and a light pipe (not shown) similar to that shown in FIGS. 1-3. It should also be noted that the HDD carrier 602 is absent of a planar support member (such as the support member 228 of FIGS. 2-3). Still, the invention is not limited in this regard. For example, the flexible sidewall can also be implemented in an HDD carrier comprising a support member.

Referring now to FIGS. 7A-7B, there are provided top views of yet another exemplary HDD carrier assembly 700 according to an embodiment of the present invention. The top view of FIG. 7A shows the HDD carrier assembly 700 in a closed position. In contrast, the top view of FIG. 7B shows the HDD carrier assembly 700 in a partially opened position. In the opened position, the HDD 104 can be inserted in or removed from the HDD carrier 702. Similarly, the vertically arranged PCT 716 can be inserted in or removed from the HDD carrier 702.

As shown in FIGS. 7A-7B, the HDD carrier 702 is generally C-shaped. The HDD carrier 702 comprises three (3) sidewalls 704, 706, 708. The sidewalls 704, 708 can be coupled together via an adhesive or other suitable coupling means. The sidewalls 704, 708 can also be integrally molded as a single component during an injection molding process or machined as a single component during a machining process. The sidewalls 704, 708 can be formed of any suitable material, such as a metal material, a composite material, and a plastic.

The sidewall 706 is configured for being removably coupled to the sidewall 708. In this regard, it should be understood that the sidewall 706 comprises a toolless coupling structure. The toolless coupling structure can include a hook 710 (as shown in FIGS. 7A-7B), a hinge (not shown), or any other suitably coupling structure. The hook 710 is configured for being inserted into an aperture 720 formed in the sidewall 708 of the HDD carrier 702 and engaging a stub 722 disposed within the aperture 720. The sidewall 706 can be formed of any suitable material, such as a metal material, a composite material, and a plastic.

Each of the sidewalls 704, 706 comprise one or more toolless securing structures. The toolless securing structures can include, but are not limited to, pins (or posts) 724 extending away from the sidewalls 704, 706. The pins 724 facilitate the retention of the HDD 104 within the HDD carrier 702. The pins 724 can have any size and shape suitable for insertion through apertures (not shown) formed in the HDD 104. In effect, the pins 724 removably retain the HDD 104 to the HDD carrier 702.

Each of the sidewalls 704, 706 is also configured to removably capture the PCT 716. In this regard, it should be understood that each of the sidewalls 704, 706 comprises a u-shaped toolless capturing member 750 extending away therefrom. The capturing member 750 defines a channel 752 for receiving at least a portion of the PCT 716 (as shown in FIGS. 7A-7B). The capturing member 750 can have a grip 754 disposed in the channel 752 for gripping a surface of the PCT 716. The capturing member 750 can also ensure that the PCT 716 is aligned with the HDD 104 when they are being retained within the HDD carrier 702.

Although not shown in FIGS. 7A-7B, the HDD carrier assembly 700 can also comprise a damper mechanism (not shown), an ejection handle (not shown), a bezel (not shown), an EMI shielding gasket (not shown), and a light pipe (not shown) similar to that shown in FIGS. 1-3. It should also be noted that the HDD carrier 702 is absent of a planar support member (such as the support member 228 of FIGS. 2-3). Still, the invention is not limited in this regard. For example, the removable sidewall can also be implemented in an HDD carrier comprising a support member.

Figure 8:
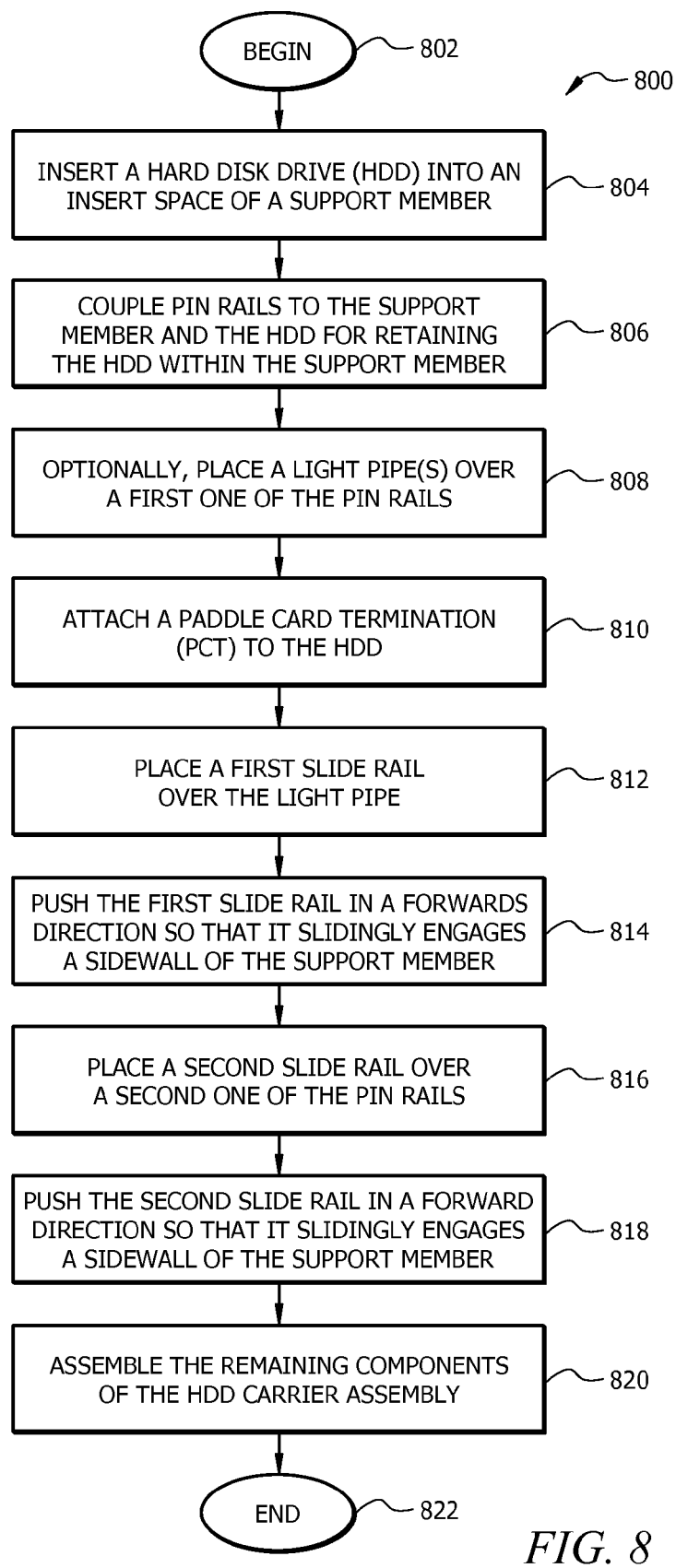
FIG. 8 is a flow diagram of a method for assembling the HDD carrier assemblies of FIGS. 1-5 that is useful for understanding the present invention.
Figure 9:
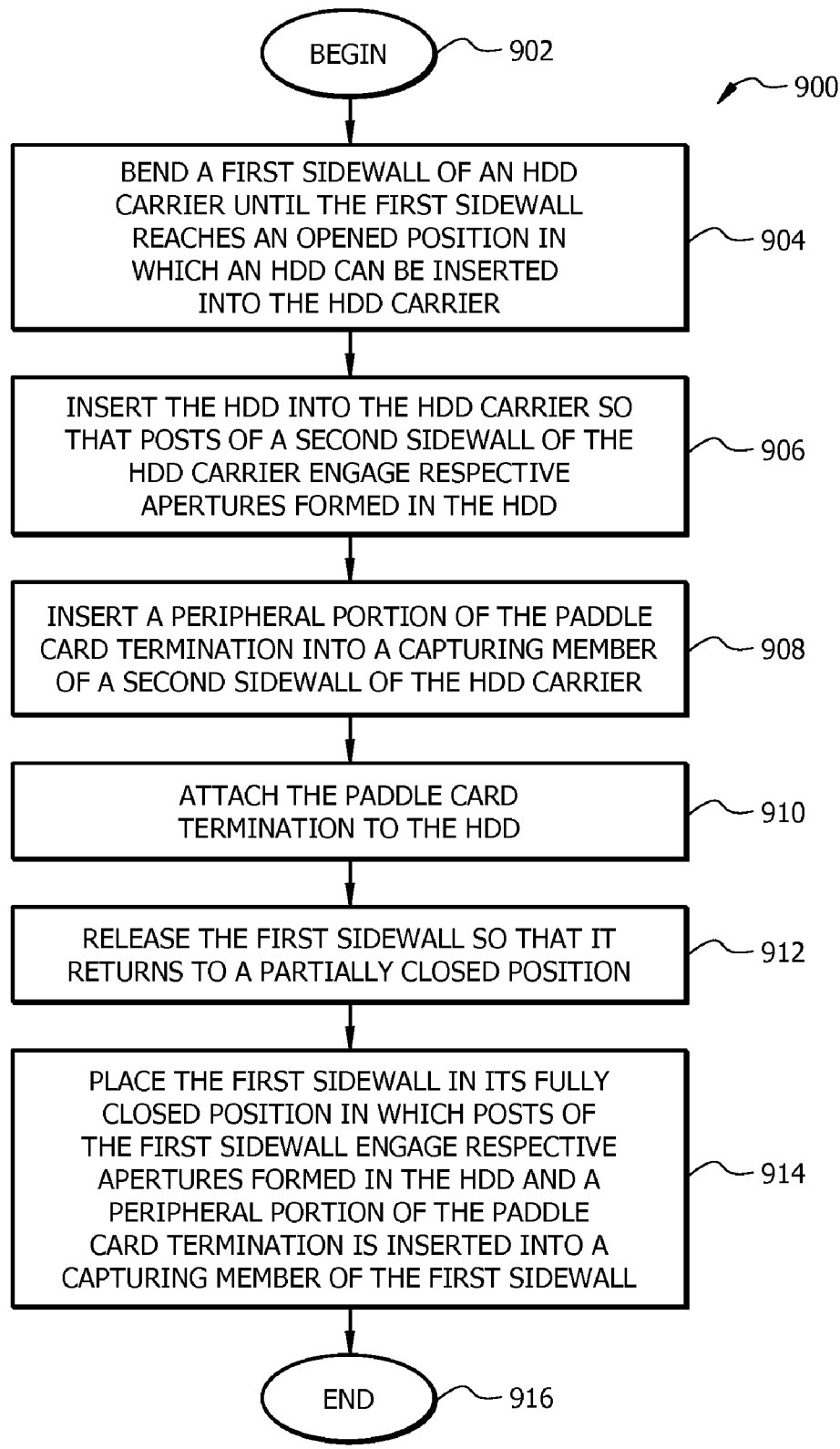
FIG. 9 is a flow diagram of a method for assembling the HDD carrier assembly of FIGS. 6A-6B that is useful for understanding the present invention.
Figure 10:
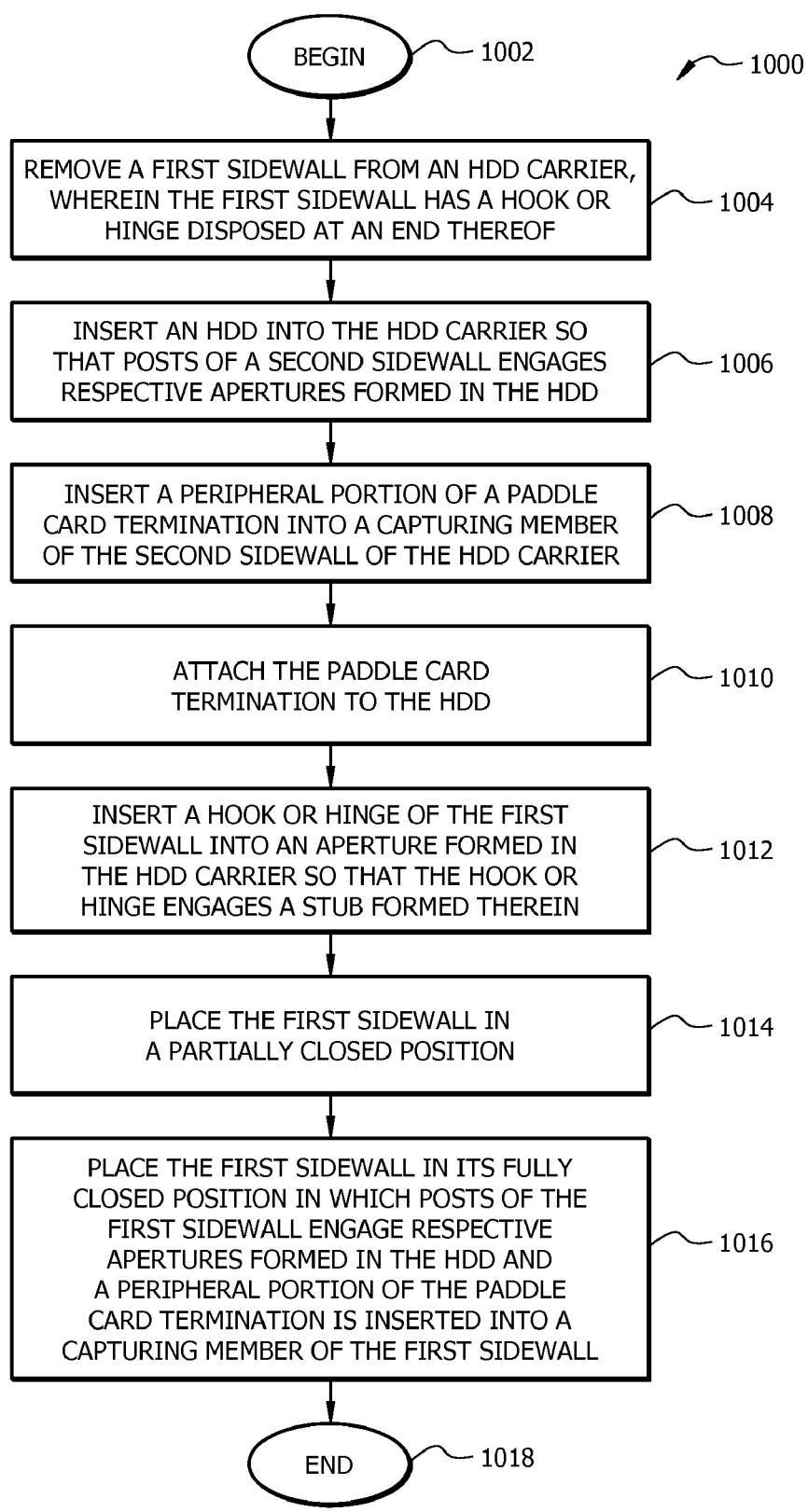
FIG. 10 is a flow diagram of a method for assembling the HDD carrier assembly of FIGS. 7A-7B that is useful for understanding the present invention.

The following FIGS. 8-10 and accompanying text illustrate methods 800, 900, 1000 according to embodiments of the present invention for assembling HDD carrier assemblies. It should be appreciated, however, that the methods 800, 900, 1000 disclosed herein are provided for purposes of illustration only and that embodiments of the present invention are not limited solely to the methods shown.

Referring now to FIG. 8, there is provided a flow diagram of a method 800 for assembling an HDD carrier assembly 100, 400 according to an embodiment of the present invention. As shown in FIG. 8, the method 800 begins with step 802 and continues with step 804. In step 804, an HDD (e.g., the HDD 104 of FIGS. 1-3) is inserted into an insert space (e.g., the insert space 238 of FIGS. 2-3) of a support member (e.g., the support member 228 of FIGS. 2-3). Thereafter, step 806 is performed where pin rails (e.g., the pin rails 222, 224 of FIGS. 2-3) are coupled to the support member and the HDD so as to retain the HDD within the support member (as shown in FIG. 3). Accordingly, step 806 can involve aligning pins (e.g., the pins 248 of FIGS. 2-3) of the pin rails with apertures (e.g., apertures 242, 275 of FIGS. 2-3) formed in the support member and HDD. Step 806 can also involve pushing the pin rails toward the support member so that the pins pass through the aperture formed in the support member and into the apertures formed in the HDD.

After completing step 806, the method 800 continues with an optional step 808. Step 808 can be performed if a light pipe (e.g., the light pipe 220 of FIGS. 2-3) of an HDD carrier assembly 100, 400 is not coupled to, disposed on, or embedded within a slide rail (e.g., the slide rail 216, 218 of FIGS. 2-3) of the HDD carrier assembly 100, 400. In optional step 808, the light pipe is placed over one of the pin rails. Next, step 810 is performed where a PCT (e.g., the PCT 106 of FIGS. 1-3) is attached to the HDD. Step 810 can involve inserting a female connector or socket (e.g., the female connector or socket 273 of FIGS. 2-3) of the PCT into a mating male connector or plug (e.g., the male connector or plug 277 of FIGS. 2-3) of the HDD.

Once the PCT is attached to the HDD, step 812 is performed where a first side rail (e.g., the slide rail 216 of FIGS. 2-3) is placed over the light pipe. Subsequently, step 814 is performed where the side rail is pushed in a forwards direction (i.e., towards a sidewall 232 of the support member 228) so that it slidingly engages a sidewall (e.g., the sidewall 234 of FIGS. 2-3) of the support member. The slide rail is pushed in the forwards direction until it is secured/locked into position via a toolless securing/locking mechanism (e.g., the springs 226 of FIGS. 2-3 and the pins 256 of FIGS. 2-3). In the locked position (shown in FIG. 3), the pin rail, light pipe, and PCT are removably secured to the support member.

Thereafter, step 816 is performed where a second slide rail (e.g., the slide rail 218 of FIGS. 2-3) is placed over a second one of the pin rails (e.g., the pin rail 222 of FIGS. 2-3). After the second slide rail is placed over the second pin rail, step 818 is performed where the second slide rail is pushed in a forwards direction (i.e., towards a sidewall 232 of the support member 228) so that it slidingly engages a sidewall (e.g., the sidewall 230 of FIGS. 2-3) of the support member. The slide rail is pushed in the forwards direction until it is secured/locked into position via a toolless securing/locking mechanism (e.g., the springs 226 of FIGS. 2-3 and the pins 256 of FIGS. 2-3). In the locked position (shown in FIG. 3), the second pin rail and PCT are removably secured to the support member.

Upon completing step 818, the method 800 continues with step 820 where the remaining components of the HDD carrier assembly 100, 400 are assembled. It should be noted that some or all of the remaining components of the HDD carrier assembly 100, 400 can be pre-assembled. For example, the ejection mechanism can be pre-assembled. In such a scenario, steps 820 simply involves placing the pre-assembled components between the slide rails. However, if the ejection mechanism is not pre-assembled, then step 820 can involve assembling an ejection mechanism comprising a damper mechanism (e.g., the damper mechanism 212 of FIGS. 2-3) and an ejection handle (e.g., the ejection handle 210 of FIGS. 2-3). Step 820 can also involve inserting the assembled ejection mechanism into a bezel (e.g., the bezel 208 of FIGS. 2-3). Step 820 can further involve coupling an EMI shielding gasket (e.g., the EMI shielding gasket 214 of FIGS. 2-3) to the bezel and placing the coupled components between the slide rails. Thereafter, step 822 is performed where the method 800 ends.

Referring now to FIG. 9, there is provided a flow diagram of a method 900 for assembling an HDD carrier assembly 600 according to an embodiment of the present invention. As shown in FIG. 9, the method 900 begins with step 902 and continues with step 904. In step 904, a first sidewall (e.g., the sidewall 606 of FIGS. 6A-6B) of an HDD carrier (e.g., the HDD carrier 602 of FIGS. 6A-6B) is bent until it reaches an opened position in which an HDD (e.g., the HDD 104 of FIGS. 6A-6B) can be inserted into the HDD carrier. Next, step 906 is performed where the HDD is inserted into the HDD carrier so that pins (e.g., the pins 610 of FIGS. 6A-6B) of the first sidewall engage apertures formed in the HDD. In step 908, a peripheral portion of the PCT is inserted into a capturing member (e.g., the capturing member 620 of FIGS. 6A-6B) of a second sidewall (e.g., the sidewall 604 of FIGS. 6A-6B) of the HDD carrier. Next, the PCT is attached to the HDD in step 910. Step 910 can involve inserting a female connector or socket of the PCT into a mating male connector or plug of the HDD.

Thereafter, step 912 is performed where the first sidewall is released so that it can return to its partially closed position. Subsequent to releasing the first sidewall, step 914 is performed where the first sidewall is placed in its fully closed position. In the fully closed position, pins (e.g., the pins 610 of FIGS. 6A-6B) of the first sidewall engage apertures formed in the HDD. Also, the PCT is captured by the first sidewall, i.e., a peripheral portion of the PCT is inserted into a capturing member (e.g., the capturing member 620 of FIGS. 6A-6B) of the first sidewall of the HDD carrier. Subsequently, step 916 is performed where the method 900 ends.

Referring now to FIG. 10, there is provided a flow diagram of a method 1000 for assembling the HDD carrier assembly 700 of FIGS. 7A-7B according to an embodiment of the present invention. As shown in FIG. 10, the method 1000 begins with step 1002 and continues with step 1004. In step 1004, a first sidewall (e.g., the sidewall 706 of FIGS. 7A-7B) is removed from an HDD carrier (e.g., the HDD carrier 702 of FIGS. 7A-7B). The first sidewall can include a toolless securing structure, such as a hook or hinge disposed at an end thereof. Thereafter, step 1006 is performed where an HDD (e.g., the HDD 104 of FIGS. 7A-7B) is inserted into the HDD carrier so that pins (e.g., the pins 724 of FIGS. 7A-7B) of a second sidewall (e.g., the sidewall 704 of FIGS. 7A-7B) engage respective apertures formed in the HDD.

In step 1008, a peripheral portion of the PCT (e.g., the PCT 716 of FIGS. 7A-7B) is inserted into a toolless capturing member (e.g., the toolless capturing member 750 of FIGS. 7A-7B) of a second sidewall of the HDD carrier. Next, the PCT is attached to the HDD in step 1010. Step 1010 can involve inserting a female connector or socket of the PCT into a mating male connector or plug of the HDD.

After the PCT is attached to the HDD, step 1012 is performed where the toolless securing structure (e.g., the hook 710 of FIGS. 7A-7B or a hinge) of the first sidewall is inserted into an aperture (e.g., the aperture 720 of FIGS. 7A-7B) formed in the HDD carrier. One the toolless securing structure is inserted into the aperture, it engages a stub (e.g., the stub 722 of FIGS. 7A-7B) formed in the aperture. Thereafter, step 1014 is performed where the first sidewall is placed in a partially closed position. In step 1016, the first sidewall is placed in its fully closed position. In the fully closed position, pins (e.g., the pins 724 of FIGS. 7A-7B) of the first sidewall engage respective apertures formed in the HDD. Also, the PCT is captured by the first sidewall, i.e., a peripheral portion of the PCT is inserted into a toolless capturing member (e.g., the toolless capturing member 750 of FIGS. 7A-7B) of the first sidewall of the HDD carrier. Subsequently, step 1018 is performed where the method 1000 ends.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A carrier for a data storage device, comprising:
   a support member sized and shaped to receive and retain the data storage device; and
   at least one projecting member configured to retain the data storage device in the support member, the projecting member extending from a portion of the carrier towards the data storage device;
   wherein the projecting member is retained in position by a structure selected from the group consisting of a rail and a sidewall of the support member, and at least one of said rail and sidewall comprises a capturing structure for capturing a peripheral edge portion of a paddle card termination.

2. The carrier according to claim 1, wherein the at least one projecting member comprises a pin.

3. The carrier according to claim 1, wherein the support member is a tray including a plurality of sidewalls coupled to a planar base member, and at least one of the plurality of sidewalls has at least one aperture formed therethrough sized and shaped to receive the at least one projecting member.

4. The carrier according to claim 1, wherein the support member has a c-shape defined by a plurality of sidewalls.

5. A carrier for a data storage device, comprising:
   a support member sized and shaped to receive and retain the data storage device;
   at least one projecting member configured to retain the data storage device in the support member, the projecting member extending from a portion of the carrier towards the data storage device; and at least one planar plate with opposing faces;

wherein the projecting member is retained in position by a structure selected from the group consisting of a rail and a sidewall of the support member, and wherein the at least one projecting member is disposed on a first face of the opposing faces and extends outwardly from the first face.

6. The carrier according to claim 5, wherein the planar plate is secured to the support member by the rail.

7. A carrier for a data storage device, comprising:
a support member sized and shaped to receive and retain the data storage device;
at least one projecting member configured to retain the data storage device in the support member, the projecting member extending from a portion of the carrier towards the data storage device, and being retained in position by a structure selected from the group consisting of a rail and a sidewall of the support member; and
a light pipe secured to the support member by the rail.

8. A carrier for a data storage device, comprising:
a support member sized and shaped to receive and retain the data storage device; and
at least one projecting member configured to retain the data storage device in the support member, the projecting member extending from a portion of the carrier towards the data storage device, and being retained in position by a rail;
wherein the rail comprises a capturing structure for capturing a peripheral edge portion of a paddle card termination.

9. A carrier for a data storage device, comprising:
a support member sized and shaped to receive and retain the data storage device; and
at least one projecting member configured to retain the data storage device in the support member, the projecting member extending from a portion of the carrier towards the data storage device;
wherein the projecting member is retained in position by a structure selected from the group consisting of a rail and a sidewall of the support member;
wherein the support member has a c-shape defined by a plurality of sidewalls; and
wherein the projecting member is disposed on a first sidewall of the plurality of sidewalls and extends outwardly from the first sidewall.

10. A carrier for a data storage device, comprising:
a support member sized and shaped to receive and retain the data storage device; and
at least one projecting member configured to retain the data storage device in the support member, the projecting member extending from a portion of the carrier towards the data storage device;
wherein the projecting member is retained in position by a structure selected from the group consisting of a rail and a sidewall of the support member;
wherein the support member has a c-shape defined by a plurality of sidewalls; and
wherein at least one of the plurality of sidewalls is formed of a flexible material.

11. A carrier for a data storage device, comprising:
a support member sized and shaped to receive and retain the data storage device; and
at least one projecting member configured to retain the data storage device in the support member, the projecting member extending from a portion of the carrier towards the data storage device;
wherein the projecting member is retained in position by a structure selected from the group consisting of a rail and a sidewall of the support member;
wherein the support member has a c-shape defined by a plurality of sidewalls; and
wherein a first sidewall of the plurality of sidewalls is removably coupled to a second sidewall of the plurality of sidewalls.

12. The carrier according to claim 11, wherein the first sidewall comprises a coupling structure selected from the group consisting of a hook and a hinge.

13. A carrier for a data storage device, comprising:
a support member sized and shaped to receive and retain the data storage device; and
at least one projecting member configured to retain the data storage device in the support member, the projecting member extending from a portion of the carrier towards the data storage device;
wherein the projecting member is retained in position by a sidewall of the support member that has a c-shape defined by a plurality of sidewalls; and
wherein at least one of the plurality of sidewalls includes a capturing structure for capturing a peripheral edge portion of a paddle card termination.

14. A carrier for a data storage device, comprising:
a support member sized and shaped to receive and retain the data storage device; and
at least one projecting member configured to retain the data storage device in the support member, the projecting member extending from a portion of the carrier towards the data storage device;
wherein the projecting member is retained in position by a structure selected from the group consisting of a rail and a sidewall of the support member;
wherein the support member has a c-shape defined by a plurality of sidewalls; and
wherein at least one of the plurality of sidewalls has a light pipe embedded therein.

15. A carrier for a data storage device, comprising:
a support member sized and shaped to receive and retain the data storage device;
at least one projecting member configured to retain the data storage device in the support member, the projecting member extending from a portion of the carrier towards the data storage device; and
a plurality of slide rails coupled to the support member and an Electro Magnetic Interference (EMI) shielding gasket captured between the plurality of slide rails;
wherein the projecting member is retained in position by a structure selected from the group consisting of a rail and a sidewall of the support member.

16. A method for assembling a data storage device carrier assembly, comprising:
inserting a data storage device into an insert space of a support member defined by a plurality of sidewalls;
removably securing the data storage device within the support member using at least one projecting member extending from a portion of the data storage device carrier assembly towards the data storage device;
retaining the projecting member in position by a structure selected from the group consisting of a rail and a sidewall of the support member; and capturing an Electro Magnetic Interference (EMI) shielding gasket between a plurality of slide rails coupled to said support member.

17. The method according to claim 16, further comprising selecting the projecting member to include a pin.

18. A method for assembling a data storage device carrier assembly, comprising:
- inserting a data storage device into an insert space of a support member defined by a plurality of sidewalls;
- removably securing the data storage device within the support member using at least one projecting member extending from a portion of the data storage device carrier assembly towards the data storage device;
- retaining the projecting member in position by a structure selected from the group consisting of a rail and a sidewall of the support member; and
- bending a first sidewall of the plurality of sidewalls until the first sidewall reaches an opened position prior to inserting the data storage device into the insert space of the support member.

19. A method for assembling a data storage device carrier assembly, comprising:
- decoupling a first sidewall of a plurality of sidewalls from a support member prior to inserting a data storage device into an insert space of the support member;
- inserting the data storage device into the insert space of the support member defined by a plurality of sidewalls;
- removably securing the data storage device within the support member using at least one projecting member extending from a portion of the data storage device carrier assembly towards the data storage device; and
- retaining the projecting member in position by a structure selected from the group consisting of a rail and a sidewall of the support member.

20. A method for assembling a data storage device carrier assembly, comprising:
- inserting a data storage device into an insert space of a support member defined by a plurality of sidewalls;
- removably securing the data storage device within the support member using at least one projecting member extending from a portion of the data storage device carrier assembly towards the data storage device;
- retaining the projecting member in position by a structure selected from the group consisting of a rail and a sidewall of the support member; and
- securing a paddle card termination to the support member using at least one capturing mechanism configured for capturing the paddle card termination without the use of a tool.

* * * * *